March 24, 1964  G. MOUTAUD  3,126,296
METHODS OF IMPREGNATING CARBONS
Filed Aug. 1, 1960
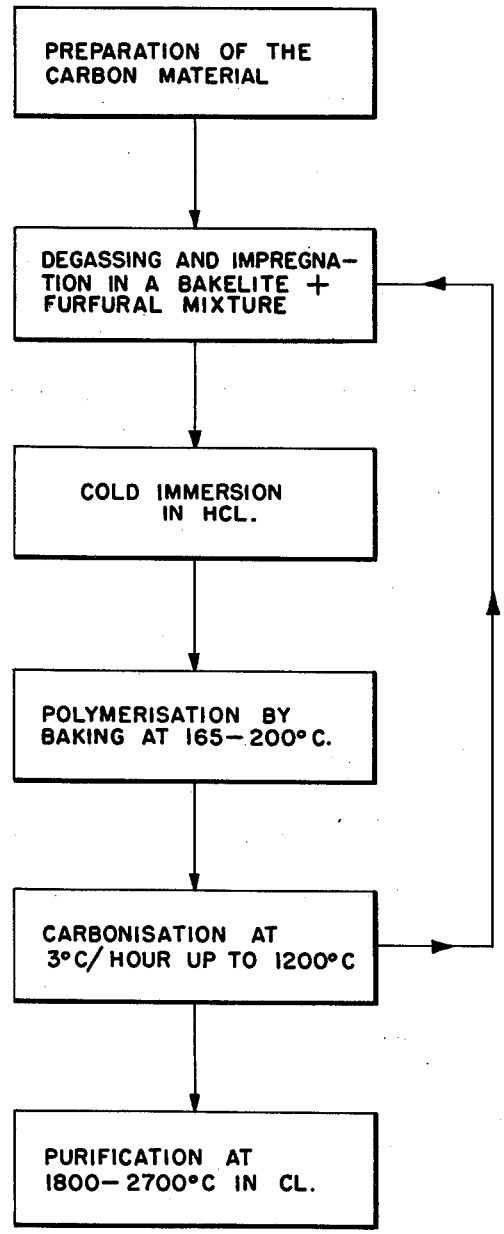
INVENTOR
GILBERTE MOUTAUD
BY *Stone & Mack*
ATTORNEYS.

United States Patent Office 3,126,296
Patented Mar. 24, 1964

3,126,296
METHODS OF IMPREGNATING CARBONS
Gilberte Moutaud, Neuilly, France, assignor to Societe le Carbone-Lorraine, Paris, France, a corporation of France
Filed Aug. 1, 1960, Ser. No. 46,329
Claims priority, application France Aug. 5, 1959
10 Claims. (Cl. 117—46)

The present invention relates to the known method of impregnating carbons for the chemical industry by means of a so-called resol Bakelite; that is a phenolformaldehyde resin obtained after the first stage in the condensation of formol and phenol, in the presence of an acid catalyst; whose resistance to chemical agents is increased by condensation in situ with furfurylic alcohol or furfurylic aldehyde; otherwise known as furfurol or furfural; and has for an object an improvement in this method.

The present invention is concerned with a subsequent or complementary known treatment of carbons already treated by the above method of impregnation, condensation and polymerisation, according to which carbons and industrial graphites are carbonised.

The carbonisation is preferably effected as slowly as possible at a temperature which progressively increases to substantially 1200° C. This complementary treatment enables carbons to be obtained which are very resistant to high temperatures and to corrosion by chemical agents, but also enables carbons which are impervious to gases and liquids to be obtained.

The impermeable carbons obtained by a combination of the two consecutive treatments may additionally be subjected to a purification in a chlorine atmosphere at a temperature of substantially 1800° C., if the carbons are intended to be used in nuclear applications which require very pure carbons.

The process of carbonisation and impermeabilisation will be better understood by means of the following example, a flow sheet for which is shown in the accompanying drawing:

Tubes made of a graphited mixture of petroleum coke and lamp-black are impregnated according to the known process, referred to above, by means of a bath comprising 70% of a resol Bakelite as defined above and 30% furfural. The tubes are immersed under vacuum for about three hours, during which they are de-gassed, as well as partially impregnated. The tubes are then subjected whilst still in the same bath to a pressure of 20 kg. nitrogen per square centimeter for approximately 15 hours for further impregnation. After letting the tubes drip and drying them, they are immersed from 12 to 48 hours in a cold concentrated hydrochloric acid bath. The carbons are then washed, dried and then progressively stoved from 3 to 4 hours at 165° C. at atmospheric pressure. The impregnating agent may, if desired, be polymerised in situ by stoving at about 200° C. under pressure. The carbonisation according to the invention is then started. In order to avoid possible bursts, the tubes are packed with absorbent cotton. They are placed in coal dust or finely ground coke, then baked whilst maintaining a speed of carbonisation such that the temperature is raised every hour by approximately 3° C. The degree of impermeabilisation is the greater the slower the speed of carbonisation, the speed of carbonisation is not subject to limitation and it is possible to obtain carbon having a satisfactory impermeability for speeds of carbonisation higher than 3° C. per hour.

In order to further reduce permeability the carbons may be repeatedly impregnated and carbonised, as indicated by the "feed-back" arrow in the flow sheet from "carbonisation" to "Degassing and Impregnation."

By the use of repeated impregnations and carbonisations, it is possible to obtain carbons having a satisfactory impermeability for speeds of carbonisation higher than 3° C. per hour, and up to 30° C. per hour.

The following table shows the permeability of various samples carbonised at 1200° C. in a Riedhammer oven, after impregnation.

| Samples | Percentage of Impregnating agent | Percentage of Impregnating agent after carbonisation at 1,200° C. | Permeability with respect to gas in cubic centimeters/hr. under 5 kg. nitrogen |
|---|---|---|---|
| 7 | 7.6 | 3.5 | 14 |
| 8 | 7.03 | 3.4 | 4 |
| 9 | 6.8 | 3.2 | 4 |
| 10 | 6.9 | 3.3 | 8 |
| 11 | 7.1 | 3.5 | 20 |

Carbons which are intended for nuclear applications may be purified after impregnation and carbonisation in a chlorine atmosphere, according to known processes, at substantially 1800° C.

I claim:

1. A method of treating carbon and industrial graphite materials for the chemical industry, comprising the steps of impregnating the said material in a bath of a formophenolic resin together with furfuryl of a phenolformaldehyde resin whose resistance to chemical agents alcohol, and slowly carbonising the materials so treated at a temperature which progressively increases at a rate of approximately 3° C. per hour or less up to a maximum temperature of the order of 1200° C.

2. A method as claimed in claim 1 in which, after carbonisation, the material is purified in a chlorine atmosphere at a temperature of substantially 1800° C.

3. A method of treating carbon and industrial graphite materials for the chemical industry, comprising the steps of impregnating the said material in a bath of a phenolformaldehyde resin whose resistance to chemical agents aldehyde, and slowly carbonising the material so treated at a temperature which progressively increases at a rate of approximately 3° C. per hour or less up to a maximum temperature of the order of 1200° C.

4. A method as claimed in claim 3 in which, after carbonisation, the material is purified in a chlorine atmosphere at a temperature of substantially 1800° C.

5. A method of treating a tube made of a graphited mixture of petroleum coke and lamp-black, which comprises the steps of impregnating said tube in a bath consisting of 70% phenolformaldehyde resin and 30% furfuryl compound of about three hours, subjecting said tube while still in said bath to a pressure of 20 kg. nitrogen per square centimeter, for approximately 15 hours, removing said tube and allowing same to drip and drying same, immersing said tube from 12 to 48 hours in a cold concentrated hydrochloric acid bath, washing and drying said tube, progressively stoving said tube from 3 to 4 hours at about 165° C. at atmospheric pressure, placing said tube in coal dust, and finally baking said tube, raising the temperature every hour by approximately 3° C.

6. A method as claimed in claim 5 comprising the additional step of polymerising said impregnating agent in situ by stoving at a temperature of about 200° C. under pressure.

7. A method as claimed in claim 5, comprising the additional step of purifying the baked tube in a chlorine atmosphere at a temperature of substantially 1800° C.

8. A method of treating a tube made of a graphited mixture of petroleum coke and lamp-black, which consists in repeatedly submitting the material to the steps of impregnating said tube in a bath consisting of 70% phenolformaldehyde resin and 30% furfuryl compound for about 3 hours, subjecting said tube while still in said bath to a pressure of 20 kg. nitrogen per square centimeter, for approximately 15 hours, removing said tube and allowing same to drip and drying same, immersing said tube from 12 to 48 hours in a cold concentrated hydrochloric acid bath, washing and drying said tube, progressively stoving said tube from 3 to 4 hours at about 165° C. at atmospheric pressure, placing said tube in coal dust, and finally baking said tube, raising the temperature every hour by approximately 3° C.

9. A method as claimed in claim 8, comprising the additional step of polymerising said impregnating agent in situ by stoving at a temperature of about 200° C. under pressure.

10. A method as claimed in claim 8, comprising the additional step of purifying the baked tube in a chlorine atmosphere at a temperature of substantially 1800° C.

References Cited in the file of this patent

UNITED STATES PATENTS

| | | |
|---|---|---|
| 1,856,680 | Williams et al. | May 3, 1932 |
| 2,174,887 | Kiefer | Oct. 3, 1939 |
| 2,749,254 | Slyh et al. | June 5, 1956 |
| 2,837,412 | Bennett | June 3, 1958 |
| 2,930,106 | Wrotnowski | Mar. 29, 1960 |
| 2,962,386 | Doll et al. | Nov. 29, 1960 |
| 2,972,552 | Winter | Feb. 21, 1961 |

FOREIGN PATENTS

| | | |
|---|---|---|
| 774,713 | Great Britain | May 15, 1957 |
| 826,084 | Great Britain | Dec. 23, 1959 |
| 1,169,208 | France | Sept. 8, 1958 |